(12) United States Patent
Shao et al.

(10) Patent No.: US 12,442,722 B2
(45) Date of Patent: Oct. 14, 2025

(54) METHODS AND INTERNET OF THINGS (IOT) SYSTEMS FOR ABNORMALITY TROUBLESHOOTING AT REFUELING STATIONS BASED ON SAFETY SUPERVISION

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Feng Wang, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/016,041

(22) Filed: Jan. 10, 2025

(65) Prior Publication Data

US 2025/0146908 A1 May 8, 2025

(30) Foreign Application Priority Data

Dec. 3, 2024 (CN) .......................... 202411755355.1

(51) Int. Cl.
*G01M 99/00* (2011.01)
*G06Q 50/26* (2012.01)
(Continued)

(52) U.S. Cl.
CPC ............. *G01M 99/00* (2013.01); *G06Q 50/26* (2013.01); *G16Y 10/40* (2020.01); *G16Y 40/10* (2020.01)

(58) Field of Classification Search
CPC ............................... G01M 99/00; G16Y 40/10
See application file for complete search history.

(56) References Cited

U.S. PATENT DOCUMENTS

2022/0388832 A1* 12/2022 Patel .................... G06Q 10/087
2023/0083626 A1* 3/2023 Shao ...................... G06N 20/00
701/2

(Continued)

FOREIGN PATENT DOCUMENTS

| CN | 118195592 A | 6/2024 |
| CN | 118887047 A | 11/2024 |
| WO | 2011092562 A2 | 8/2011 |

OTHER PUBLICATIONS

Zhao, Ning, Analysis of Transmission Difference of CNG Filling Station and Discussion on Control Measures, Oilfield Management, 2019, 2 pages.

(Continued)

*Primary Examiner* — Ricky Go
(74) *Attorney, Agent, or Firm* — Metis IP LLC

(57) ABSTRACT

Provided is a method for abnormality troubleshooting at a gas refueling station based on safety supervision, comprising: generating a refueling anomaly warning based on refueling error anomaly information and refueled vehicle anomaly information; generating a device inspection instruction based on the refueling anomaly warning and a device characteristic of a refueling device; determining an additional monitoring parameter corresponding to each of one or more devices to be inspected based on the device inspection instruction and uploading the additional monitoring parameter to a smart gas device object platform; generating a monitoring instruction and sending the monitoring instruction to a monitoring device associated with the one or more devices to be inspected; generating an initial inspection result based on an additional monitoring result and a routine monitoring result, uploading the initial inspection
(Continued)

result to a smart gas government safety supervision management platform, and storing the initial inspection result in a database.

9 Claims, 5 Drawing Sheets

(51) Int. Cl.
  *G16Y 10/40* (2020.01)
  *G16Y 40/10* (2020.01)

(56) References Cited

U.S. PATENT DOCUMENTS

2023/0230050 A1* 7/2023 Shao ............... G16Y 10/35
  702/184
2023/0368632 A1* 11/2023 Shao ............... G16Y 40/10

OTHER PUBLICATIONS

Wang, Bo et al., A State Monitoring Method of Gas Regulator Station Based on Evidence Theory Driven by Time-Domain Information, IEEE Transactions on Industrial Electronics, 2021, 9 pages.
Notification to Grant Patent Right for Invention in Chinese Application No. 202411755355.1 mailed on Feb. 28, 2025, 4 pages.
First Office Action in Chinese Application No. 202411755355.1 mailed on Feb. 10, 2025, 11 pages.

\* cited by examiner

METHODS AND INTERNET OF THINGS (IOT) SYSTEMS FOR ABNORMALITY TROUBLESHOOTING AT REFUELING STATIONS BASED ON SAFETY SUPERVISION

CROSS REFERENCE TO RELATED APPLICATIONS

This application claims priority to Chinese Patent Application No. 202411755355.1, filed on Dec. 3, 2024, the entire contents of which are incorporated herein by reference.

TECHNICAL FIELD

The present disclosure relates to the field of safety supervision of a refueling station, and in particular, to methods and Internet of Things (IoT) systems for abnormality troubleshooting at refueling stations based on safety supervision.

BACKGROUND

Refueling stations are usually constructed within cities for refueling vehicles, or in townships and industrial zones where there is no gas pipeline to supply natural gas. A refueling master station uses a compressor to compress and store natural gas, and the compressed natural gas is transported by a dedicated transport vehicle to a sub-station, which refuels vehicles or other gas-using devices.

A refueling system of the refueling station includes a plurality of facilities, such as a compressor, an intake air buffer tank, a pre-treatment system, a cooling system, a lubrication system, an air storage system, etc. When a metering error or a metering fluctuation problem occurs in the refueling station, conventionally, each facility in the refueling system is inspected individually, which may lead to high labor and time costs. In addition, inspecting each facility in the refueling system is not always effective, thereby resulting in a reduction of refueling efficiency, which is not convenient for the operation of the refueling station.

Therefore, there is a need to provide a method for abnormality troubleshooting at a refueling station based on safety supervision, which can efficiently and accurately troubleshooting an abnormality of a refueling system of the refueling station, reduce labor and time costs, and to improve the refueling efficiency of the refueling station.

SUMMARY

One or more embodiments of the present disclosure provide a method for abnormality troubleshooting at a refueling station based on safety supervision, which is performed by a gas company management platform of an Internet of Things (IoT) system for abnormality troubleshooting at a refueling station based on safety supervision. The method includes: collecting refueling information of at least one refueled vehicle during a predetermined time period through a smart gas device object platform; processing the refueling information to generate refueling error anomaly information; receiving, through a smart control center, refueled vehicle anomaly information uploaded by a gas user object platform; generating a refueling anomaly warning based on the refueling error anomaly information and the refueled vehicle anomaly information and sending the refueling anomaly warning to a console of a refueling system of a refueling station corresponding to the refueling anomaly warning and to a smart gas government safety supervision management platform, wherein the refueling information collected in the predetermined time period is related with at least one of an abnormal vehicle and a refueling time corresponding to the refueled vehicle anomaly information. The method further comprises: generating a device inspection instruction based on the refueling anomaly warning and a device characteristic of a refueling device obtained from the refueling system; controlling a monitoring device to determine an additional monitoring parameter corresponding to each of one or more devices to be inspected based on the device inspection instruction and uploading the additional monitoring parameter to the smart gas device object platform, wherein the additional monitoring parameter includes at least one of an additionally turned-on and an additionally turned-on monitoring device; obtaining aggregated additional monitoring parameters corresponding to the one or more devices to be inspected through the smart gas device object platform. The method further comprises: generating a first monitoring instruction and sending, through the smart gas device object platform, the first monitoring instruction to a first monitoring device associated with the one or more devices to be inspected, wherein the first monitoring instruction is configured to adjust an existing monitoring parameter of the first monitoring device, and the first monitoring device is a monitoring device that is currently performing monitoring; generating a second monitoring instruction and sending, through the smart gas device object platform, the second monitoring instruction to a second monitoring device associated with the one or more devices to be inspected, wherein the second monitoring instruction is configured to initiate new monitoring, and the second monitoring device is a monitoring device that has not initiated monitoring; and generating an initial inspection result based on an additional monitoring result and a routine monitoring result, uploading the initial inspection result to the smart gas government safety supervision management platform, and storing the initial inspection result in a database.

One or more embodiments of the present disclosure provide an Internet of Things (IoT) system for abnormality troubleshooting at a refueling station based on safety supervision, which comprises: a smart gas government safety supervision management platform, a smart gas government safety supervision sensor network platform, a smart gas government safety supervision object platform, a gas company sensor network platform, and a gas user object platform and a smart gas device object platform interacting with the gas company sensor network platform. The smart gas government safety supervision object platform includes a gas company management platform; the smart gas government safety supervision sensor network platform interacts with the smart gas government safety supervision management platform and the gas company management platform, respectively. The gas company management platform is disposed in a smart control center of a gas company, the smart control center including a server, a storage device, and a data transmission component, and the gas company management platform is connected to the smart gas device object platform at the refueling station via a signal based on a communication network, the communication network being operated under the control of the gas company sensor network platform. The gas company sensor network platform includes a sensor network sub-platform corresponding to the refueling station, the sensor network sub-platforms being configured on a communication server of the refueling station; the smart gas device object platform is disposed in a control center of the refueling station and connected to a refueling system corresponding to the refueling station via a signal, the refueling system including a console and a plurality of refueling devices.

One or more embodiments of the present disclosure provide a non-transitory computer-readable storage medium. The storage medium stores computer instructions, and when a computer reads the computer instructions in the storage medium, the computer executes the method for abnormality troubleshooting at a refueling station based on safety supervision provided in the present disclosure.

BRIEF DESCRIPTION OF THE DRAWINGS

The present disclosure will be further illustrated by way of exemplary embodiments, which will be described in detail by means of drawings. These embodiments are non-limiting exemplary embodiments, in which same reference numerals represent same structures, wherein.

DETAILED DESCRIPTION

Figure 1:
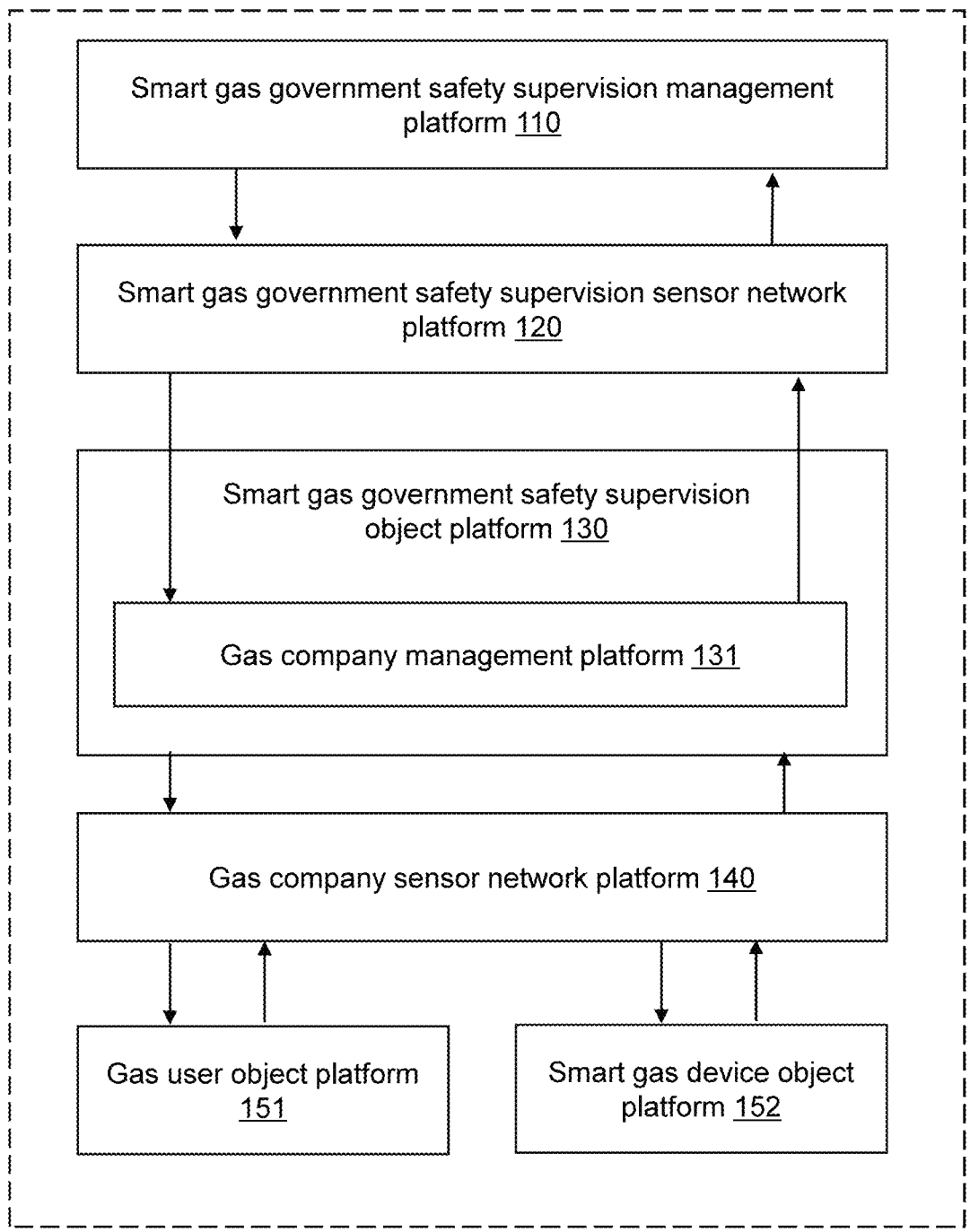
FIG. 1 is a schematic diagram illustrating an Internet of Things (IoT) system for abnormality troubleshooting at a refueling station based on safety supervision according to some embodiments of the present disclosure.

In order to more clearly illustrate the technical solution of the embodiments of the present disclosure, the drawings required to be used in the description of the embodiments are briefly described below. Obviously, the drawings in the following description are only some examples or embodiments of the present disclosure, and it is possible for those skilled in the art to apply the present disclosure to other similar scenarios according to these drawings without creative labor. Unless obviously obtained from the context or the context illustrates otherwise, same reference numerals in the drawings represent same structures or operations.

It should be understood that the terms "system," "device," "unit," and/or "module" as used herein is a way to distinguish between different components, elements, parts, sections or assemblies at different levels. However, these words may be replaced by other expressions if other words accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate operations performed by a system according to embodiments of the present disclosure. It should be understood that the preceding or following operations are not necessarily performed in an exact sequence. Instead, steps may be processed in reverse order or simultaneously. Also, it is possible to add other operations to these processes or remove one or more operations from these processes.

A refueling system of a refueling station contains complex facilities. When encountering issues such as metering errors during a refueling process, it is necessary to spend a lot of labor and time inspecting each refueling facility individually. Additionally, there may be ineffective inspections during the refueling process, which results in reduced efficiency of the refueling station.

In view of the foregoing, according to some embodiments of the present disclosure, it is desirable to provide an improved method for abnormality troubleshooting at a refueling station based on safety supervision.

FIG. 1 is a schematic diagram illustrating an Internet of Things (IoT) system for abnormality troubleshooting at a refueling station based on safety supervision according to some embodiments of the present disclosure.

As shown in FIG. 1, the IoT system 100 for abnormality troubleshooting at a refueling station based on safety supervision (hereinafter referred to as the smart gas refueling station IoT system 100) includes a smart gas government safety supervision management platform 110, a smart gas government safety supervision sensor network platform 120, a smart gas government safety supervision object platform 130, a gas company sensor network platform 140, and a gas user object platform 151 and a smart gas device object platform 152 interacting with the gas company sensor network platform 140.

The smart gas government safety supervision management platform 110 refers to an IoT platform that integrates and coordinates the linkage and collaboration among different functional platforms to provide perception management and control management.

In some embodiments, the smart gas government safety supervision management platform 110 receives a correction check result generated by a gas company management platform 131. In some embodiments, the smart gas government safety supervision management platform 110 generates a refueling quality ranking based on correction check results of a plurality of refueling stations corresponding to a same gas source type, and sends the refueling quality ranking to the gas company management platform 131.

The smart gas government safety supervision sensor network platform 120 is a platform through which the smart gas government safety supervision management platform 110 and the smart gas government safety supervision object platform 130 interact with each.

In some embodiments, the smart gas government safety supervision sensor network platform 120 interacts with the smart gas government safety supervision management platform 110.

The smart gas government safety supervision object platform 130 is a functional platform for sensing the generation of information and controlling the execution of information. For example, the smart gas government safety supervision object platform 130 controls the gas company management platform 131 to obtain data from the gas company sensor network platform 140, or sends a control instruction to the gas company sensor network platform 140 via the gas company management platform 131. In some embodiments, the smart gas government safety supervision object platform 130 includes the gas company management platform 131.

In some embodiments, the smart gas government safety supervision sensor network platform 120 interacts with the smart gas government safety supervision object platform 130.

In some embodiments, the gas company management platform 131 is disposed in a smart control center of a gas company. The smart control center includes a server, a storage device, and a data transmission component. The data transmission component includes devices such as a router, a gateway, and a switch.

In some embodiments, the gas company sensor network platform 140 interacts with the smart gas device object platform 152. In some embodiments, the gas company management platform 131 is connected to a plurality of smart gas device object platforms 152 of a plurality of refueling stations via a signal based on a communication network. The communication network operates under the control of the gas company sensor network platform 140.

In some embodiments, the gas company management platform 131 executes a method for abnormality troubleshooting at a refueling station based on safety supervision.

For example, the gas company management platform 131 collects refueling information of at least one refueled vehicle during a predetermined time period through the smart gas device object platform 152. As another example, the gas company management platform 131 processes the refueling information of the at least one refueled vehicle to generate refueling error anomaly information. As yet another example, the gas company management platform 131 generates a refueling anomaly warning based on the refueling error anomaly information and refueled vehicle anomaly information, and sends the refueling anomaly warning to a console of a refueling system of the refueling station corresponding to the refueling anomaly warning.

Figure 2:
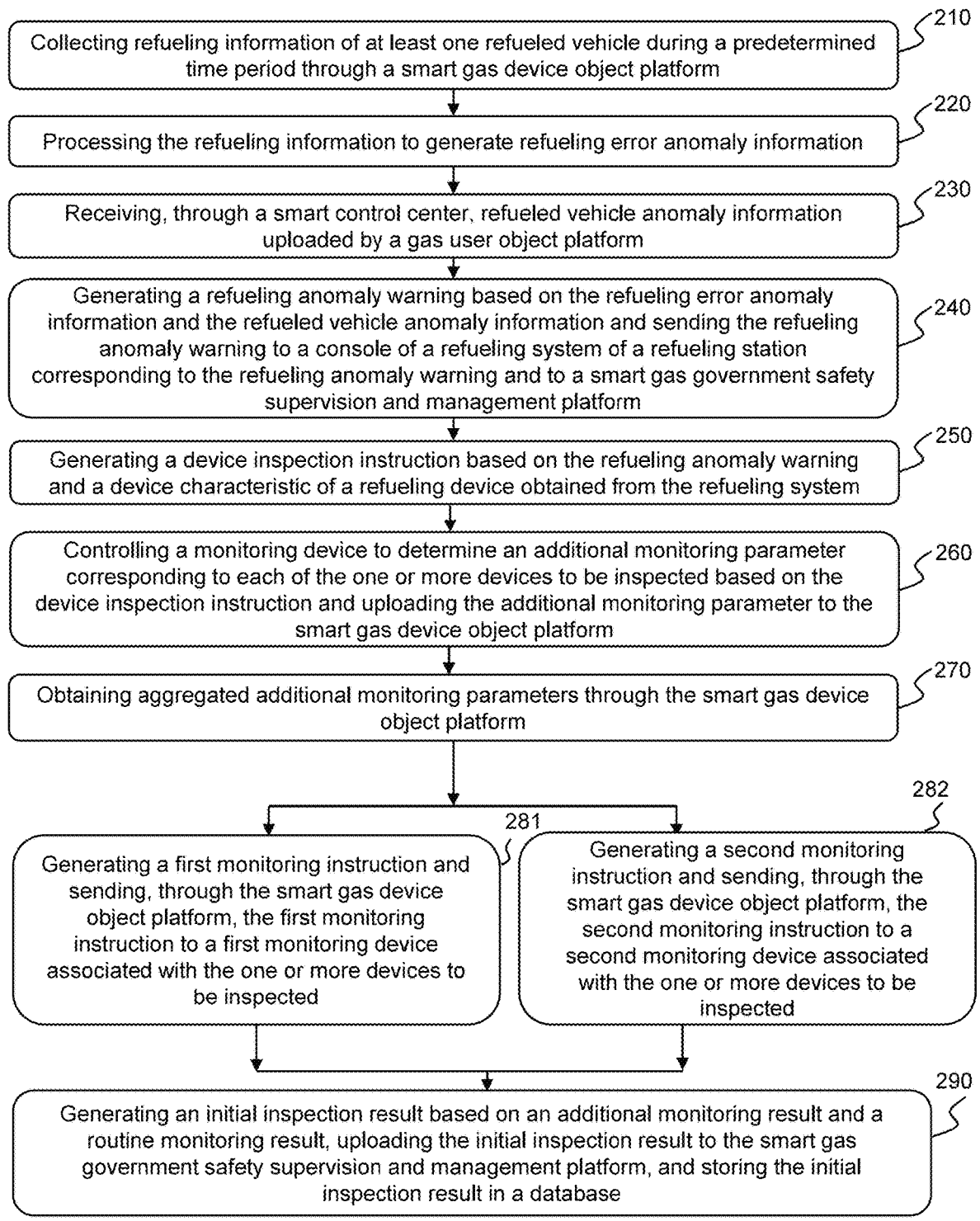
FIG. 2 is a flowchart illustrating an exemplary process for abnormality troubleshooting at a refueling station based on safety supervision according to some embodiments of the present disclosure.

More details regarding the method for abnormality troubleshooting at a refueling station based on safety supervision may be found in FIG. 2 and the related descriptions thereof.

In some embodiments, the gas company management platform 131 is configured to process the refueling information of the refueled vehicle to generate the refueling error anomaly information.

For example, the gas company management platform 131 conducts a metering fluctuation determination at a predetermined judgment frequency. The metering fluctuation determination includes: determining a current analysis interval based on a current moment; executing a first judgment instruction within the current analysis interval; determining whether a first predetermined count of refueling intensive periods include target refueling information; in response to determining that the refueling intensive periods include the target refueling information, generating a metering fluctuation set based on the target refueling information; and generating the refueling error anomaly information based on the metering fluctuation set, and storing the refueling error anomaly information in the storage device of the smart control center.

In some embodiments, the first predetermined count is determined based on a concentration degree of different refueling intensive periods in the analysis interval. The refueling information distributed in the first predetermined count of refueling intensive periods is not less than a predetermined proportion. More details for determining the first predetermined count may be found in FIG. 3 and the related descriptions thereof.

In response to determining that the refueling intensive periods do not include the target refueling information, the gas company management platform 131 executes one or more second judgment instructions. Each of the one or more second judgment instructions includes: selecting a target interval as an expansion interval pending evaluation from the current analysis interval, wherein the target interval is a time interval that is not selected by the first judgment instruction and not selected by one or more second judgment instructions that have been executed; determining target refueling information in the expansion interval pending evaluation; and generating the refueling error anomaly information for the target refueling information in the current analysis interval. A count of the one or more second judgment instructions does not exceed a second predetermined count, and the second predetermined count is determined based on a time feature and the predetermined judgment frequency.

Figure 3:
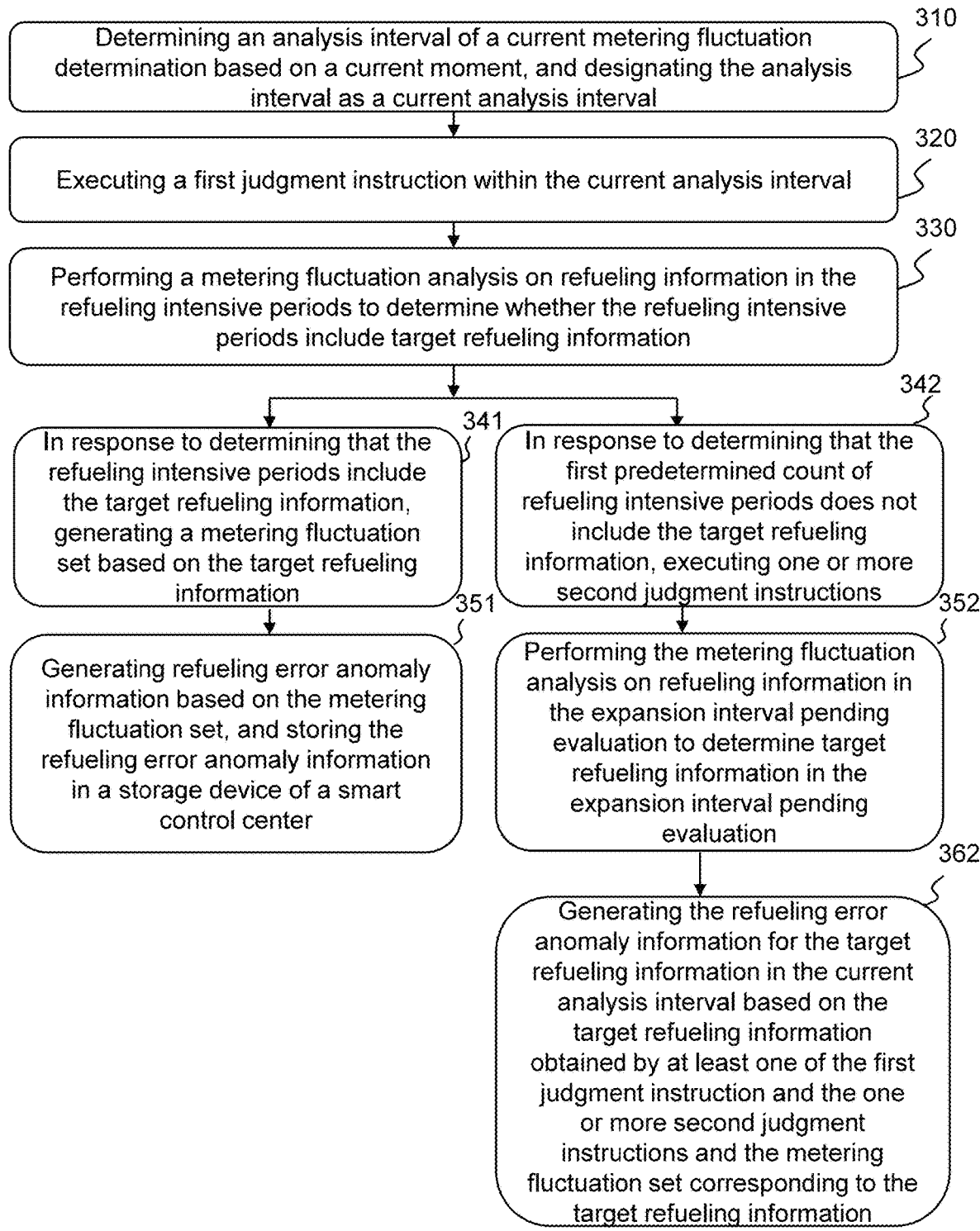
FIG. 3 is a schematic diagram illustrating a process for generating refueling error anomaly information according to some embodiments of the present disclosure.

More descriptions of generating the refueling error anomaly information may be found in FIG. 3 and the related descriptions thereof.

In some embodiments, the gas company management platform 131 is configured to generate the refueling anomaly warning and send the refueling anomaly warning to the console of the refueling system of the refueling station corresponding to the refueling anomaly warning and to a refueling user terminal corresponding to the abnormal vehicle. For example, the gas company management platform 131 generates the refueling error anomaly information based on the refueled vehicle anomaly information and metering fluctuation data corresponding to the refueling information. As another example, the gas company management platform 131 generates the refueling anomaly warning based on the refueling error anomaly information and the refueled vehicle anomaly information, and sends the refueling anomaly warning to the console of the refueling system of the refueling station corresponding to the refueling anomaly warning and to the refueling user terminal corresponding to the abnormal vehicle. More details for generating the refueling anomaly warning may be found in FIG. 2 and the related descriptions thereof.

In some embodiments, the gas company management platform 131 generates the refueling error anomaly information through a refueling model. For example, the gas company management platform 131 determines the refueling error anomaly information based on the refueled vehicle anomaly information, the metering fluctuation set including the metering fluctuation data, and an environmental parameter through the refueling model. The refueling error anomaly information includes at least one of an anomalous time and an anomalous amount. In some embodiments, the refueling model is a machine learning model.

In some embodiments, the refueling model is obtained by training a plurality of sets of training samples with labels. In some embodiments, the plurality of sets of training samples are determined based on historical monitoring data or generated based on a platform simulation. The plurality of sets of training samples generated based on the platform simulation include training samples generated by simulating target historical data, and the target historical data includes historical monitoring data including the refueling error anomaly information.

Figure 4:
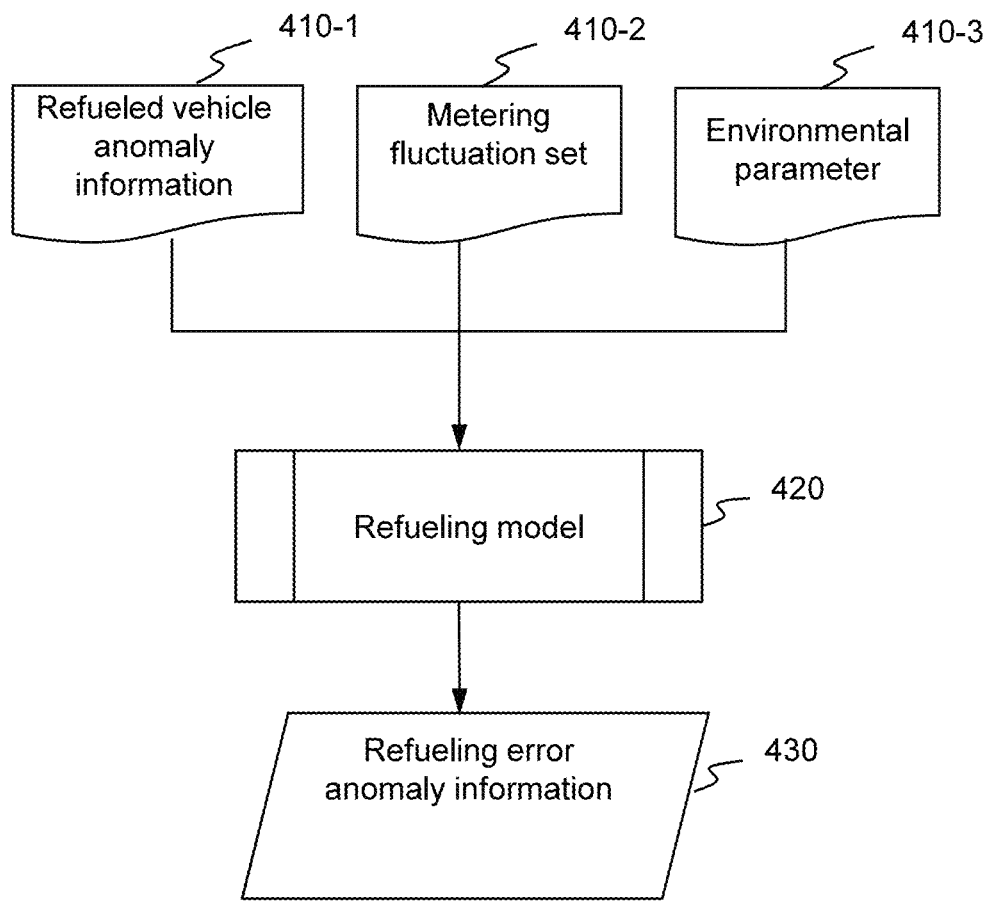
FIG. 4 is a schematic diagram illustrating a process for generating refueling error anomaly information via a refueling model according to some embodiments of the present disclosure.

More descriptions of the refueling modeling may be found in FIG. 4 and the related descriptions thereof.

In some embodiments, the gas company management platform 131 is further configured to generate a device self-inspection parameter corresponding to each of the refueling stations and send the device self-inspection parameter to a corresponding refueling station. For example, the gas company management platform 131 is configured to generate the correction check result based on the environmental parameter, an additional monitoring result, and a routine monitoring result, and to send the correction check result to the smart gas government safety supervision management platform 110. As another example, the gas company management platform 131 obtains a refueling quality ranking generated by the smart gas government safety supervision management platform 110, and generates the device self-inspection parameter corresponding to a refueling station based on the refueling quality ranking and sends the device self-inspection parameter to the refueling station.

Figure 5:
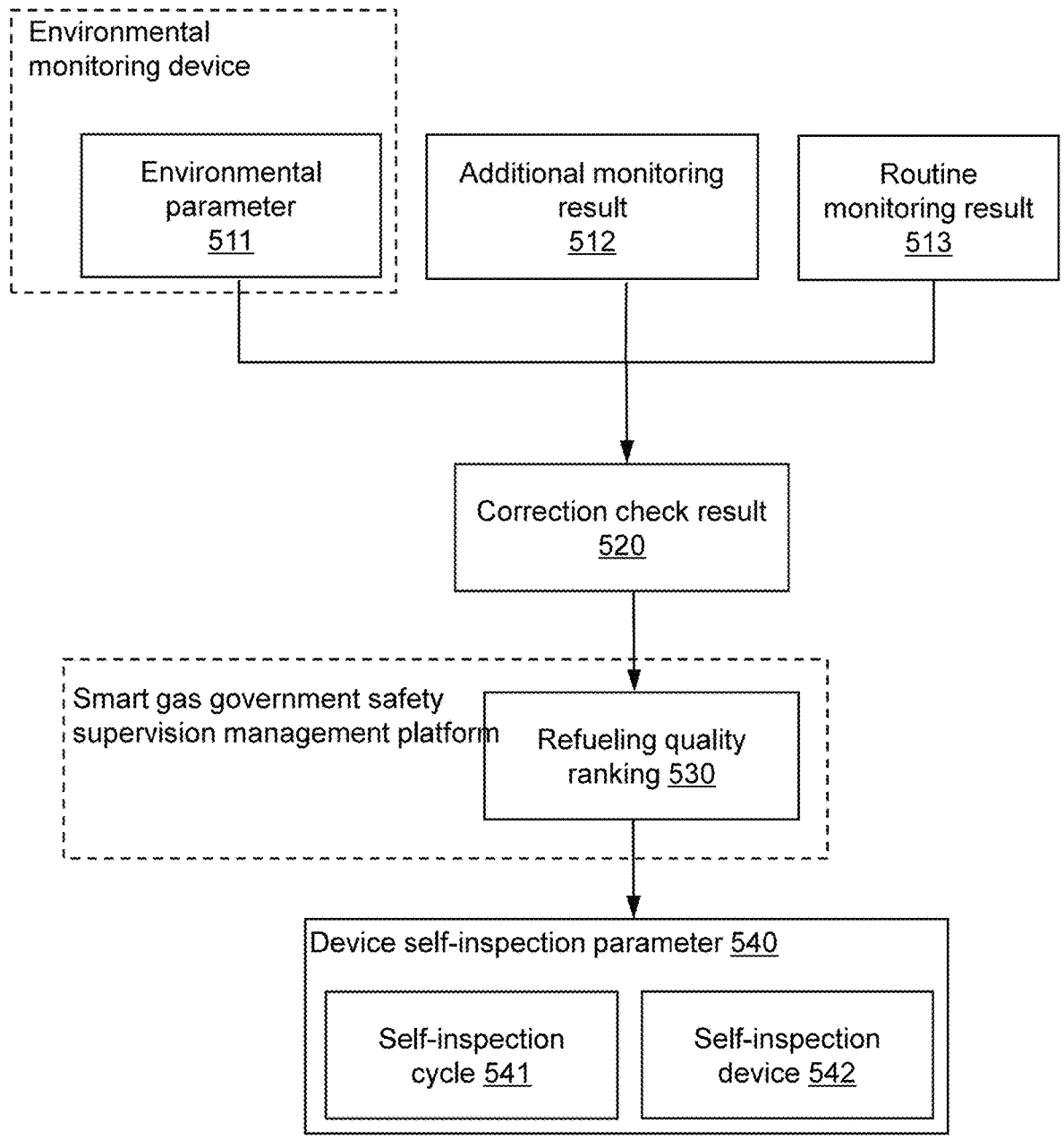
FIG. 5 is a schematic diagram illustrating a process for generating a device self-inspection parameter according to some embodiments of the present disclosure.

More descriptions of generating the device self-inspection parameter may be found in FIG. 5 and the related descriptions thereof.

The gas company sensor network platform 140 is a bridging platform for interaction between the gas company management platform 131 and the gas user object platform 151 and between the gas company management platform 131 and the smart gas device object platform 152.

In some embodiments, the gas company sensor network platform 140 uploads the refueling information of the at least one refueled vehicle to the smart control center corresponding to the gas company management platform 131. In some embodiments, the gas company sensor network platform 140 includes at least one sensor network sub-platform corresponding to the at least one refueling station. Each of the at least one sensor network sub-platform is disposed on a communication server of the corresponding refueling station.

The gas user object platform 151 is a functional platform for sensing the generation of information and controlling the execution of information. For example, the gas user object platform 151 is connected to a user terminal of a refueled vehicle of a user. In some embodiments, the gas user object platform 151 obtains at least one piece of refueled vehicle anomaly information uploaded by the user terminal and uploads the at least one piece of refueled vehicle anomaly information to the smart control center corresponding to the gas company management platform 131. In some embodiments, the gas user object platform 151 interacts with the gas company sensor network platform 140.

The smart gas device object platform 152 is a functional platform for sensing the generation of information and controlling the execution of information.

For example, the smart gas device object platform 152 is configured to collect the refueling information of at least one refueled vehicle during a predetermined time period. The refueling information includes at least one of a refueling start time and a refueling end time, a refueling type (e.g., fast-fill or slow-fill), a refueling volume, or the like. In some embodiments, the smart gas device object platform 152 interacts with the gas company sensor network platform 140. In some embodiments, the gas company management platform 131 is connected to the smart gas device object platform 152 at the plurality of refueling stations via a signal based on the communication network. The communication network operates under the control of the gas company sensor network platform 140.

In some embodiments, the smart gas device object platform 152 is disposed in the control center of the refueling station and connected to the refueling system of each refueling station via a signal. Each refueling system includes a console and a plurality of refueling devices.

For those skilled in the art, with an understanding of the principle of the IoT system, it is possible to apply the smart gas refueling station IoT system 100 to any suitable scenario without departing from the principle.

It should be noted that the above descriptions of the smart gas refueling station IoT system and the platforms thereof are for descriptive convenience, and do not limit the present disclosure to the scope of the cited embodiments. It may be understood that, for those skilled in the art, with an understanding of the principle of the smart gas refueling station IoT system, it is possible to make any combination of platforms or form subsystems to connect to other components without departing from the principle. For example, the various platforms share a common storage device, and each of the various platforms has its own storage device. These variations are within the scope of protection of the present disclosure.

FIG. 2 is a flowchart illustrating an exemplary process for abnormality troubleshooting at a refueling station based on safety supervision according to some embodiments of the present disclosure. As shown in FIG. 2, process 200 includes the following operations. In some embodiments, process 200 may be performed by a gas company management platform.

In 210, collecting refueling information of at least one refueled vehicle during a predetermined time period through a smart gas device object platform.

More descriptions of the smart gas device object platform may be found in FIG. 1 and the related descriptions thereof.

The predetermined time period is a pre-set time interval.

In some embodiments, the gas company management platform obtains the predetermined time period in multiple ways. For example, the gas company management platform determines the predetermined time period based on the opening hours of the refueling station. As another example, the gas company management platform determines at least one refueling intensive period based on a time period of concentrated refueling of refueling users. The at least one refueling intensive period, or a time interval between neighboring refueling intensive periods, is determined as the predetermined time period.

More descriptions of the refueling intensive period may be found in operation 320 below and the related descriptions thereof.

A refueled vehicle refers to a vehicle that is refueled in a smart gas refueling station.

The refueling information of a refueled vehicle refers to information related to a refueling process and/or a refueling condition of the refueled vehicle. In some embodiments, the refueling information includes at least one of a refueling time, a refueling type, refueling flow volumes corresponding to a plurality of time points, or the like.

The refueling time includes at least one of a refueling start time, a refueling end time, a refueling duration, or the like. The refueling type includes at least one of fast filling, slow filling, or the like.

In some embodiments, the smart gas device object platform obtains the refueling information in multiple ways. For example, the smart gas device object platform obtains the refueling information by controlling a timer to record the refueling time, or the like. The refueling type is determined based on a manual input. The refueling flow is obtained by controlling a flow sensor. In some embodiments, the smart gas device object platform uploads the refueling information to the gas company management platform.

In 220, processing the refueling information to generate refueling error anomaly information.

The refueling error anomaly information is refueling information in which a difference between the refueling information and a refueling standard value exceeds a predetermined error range.

In some embodiments, the refueling standard value includes at least one of a refueling standard time, a refueling standard flow volume, or the like.

In some embodiments, the refueling error anomaly information includes at least one of a refueling error anomaly time, a refueling error anomaly flow volume, or the like.

In some embodiments, the predetermined error range includes at least one of a time error range, a flow volume error range, or the like.

In some embodiments, the gas company management platform determines the refueling standard value and the predetermined error range in a variety of ways. For example, the gas company management platform determines the refueling standard value and the predetermined error range by obtaining the manual input, obtaining from historical data, or the like. For example, the predetermined error range is in a range of ±1% of the refueling standard value, etc.

More details of determining the refueling error anomaly information may be found in the description of FIG. 3.

In 230, receiving, through a smart control center, refueled vehicle anomaly information uploaded by a gas user object platform.

More details regarding the smart control center and the gas user object platform may be found in the description of FIG. 1.

The refueled vehicle anomaly information refers to information related to an anomalous condition of the at least one refueled vehicle. In some embodiments, the refueled vehicle anomaly information includes at least one of an abnormal reading of a gas storage tank of the at least one refueled vehicle, an abnormality of the refueling time, etc.

In some embodiments, the gas user object platform obtains the refueled vehicle anomaly information in a variety of ways, for example, the gas user object platform obtains the refueled vehicle anomaly information from a user terminal of a refueling user, etc. The user terminal includes at least one of a cell phone, a computer, or the like.

In 240, generating a refueling anomaly warning based on the refueling error anomaly information and the refueled vehicle anomaly information, and sending the refueling anomaly warning to a console of a refueling system of a refueling station corresponding to the refueling anomaly warning and to a smart gas government safety supervision management platform.

The refueling anomaly warning refers to a warning notice used to warn that there is an anomaly in the refueling process of a certain refueling device within a refueling station and to identify the refueling device as an abnormal refueling device.

The refueling device refers to a device in a refueling station that refuels vehicles of refueling users. For example, the refueling device includes at least one of a compressor, an intake buffer device, a gas pretreatment device, a cooling system, a gas storage device, a refueling pipeline, or the like. The abnormal refueling device refers to a refueling device that is malfunctioning and requires maintenance. In some embodiments, when different refueling devices malfunction, it may result in different errors in the refueling information.

In some embodiments, the gas company management platform assigns a number to each refueling device in the refueling system corresponding to the refueling station, and the refueling anomaly warning includes alerting that there is an abnormality in the refueling device corresponding to a certain number.

In some embodiments, the gas company management platform determines the abnormal refueling device in a plurality of ways, thereby determining the refueling anomaly warning. For example, based on historical refueling error anomaly information, historical refueled vehicle anomaly information, and a historical abnormal refueling device identified through human inspection, troubleshooting, or device warning in historical data, the gas company management platform creates a first data table. The first data table includes a correspondence between the historical refueling error anomaly information, the historical refueled vehicle anomaly information, and the historical abnormal refueling device.

The gas company management platform queries the first data table based on current gas refueling error anomaly information and current gas refueled vehicle anomaly information to determine historical gas refueling error anomaly information and historical refueled vehicle anomaly information corresponding to the current gas refueling error anomaly information and the current gas refueled vehicle anomaly information, and determine the historical abnormal refueling device corresponding to the historical refueling error anomaly information and the historical refueled vehicle anomaly information as a current abnormal refueling device.

In some embodiments, the refueling information collected during the predetermined time period is correlated with at least one of an abnormal vehicle corresponding to the refueled vehicle anomaly information and a refueling time corresponding to the refueled vehicle anomaly information.

In some embodiments, a vehicle corresponding to the refueling information collected during the predetermined time period and the abnormal vehicle corresponding to the refueled vehicle anomaly information is the same vehicle. In some embodiments, the refueling information collected during the predetermined time period includes a plurality of pieces of refueling information corresponding to the refueling time of the abnormal vehicle.

In 250, generating a device inspection instruction based on the refueling anomaly warning and a device characteristic of a refueling device obtained from the refueling system.

The device characteristic is a characteristic associated with the refueling device. In some embodiments, the device characteristic includes at least one of a device operating parameter, a cumulative runtime, a current continuous runtime, and a count of repairs corresponding to the refueling device.

The device operating parameter refers to a type, a model, etc., of the refueling device.

In some embodiments, the refueling system records and stores the device characteristic. The refueling system may upload the device characteristic to the gas company management platform.

The device inspection instruction is an instruction to check one or more devices to be inspected. In some embodiments, the device inspection instruction includes at least one of the device operating parameter and ranking of the one or more devices to be inspected. For example, the compressor, the intake buffer device, and the gas pretreatment device are inspected sequentially.

A device to be inspected is a refueling device that needs to be inspected.

In some embodiments, the gas company management platform generates the device inspection instruction in a variety of ways. For example, the gas company management platform identifies the one or more devices to be inspected based on the refueling anomaly warning, determines a check score for each of the one or more devices to be inspected based on the device characteristic of the device to be checked, and sorts the at least one device to be inspected based on their check scores. In some embodiments, the ranking includes sorting the at least one device to be inspected based on the check scores thereof in a descending order. Inspection of the refueling device with a largest check score is prioritized. The device inspection instruction is generated based on a ranking result.

The check scores of the one or more devices to be inspected are scores associated with an inspection sequence of the one or more devices to be inspected.

In some embodiments, the gas company management platform determines the check scores of the one or more devices to be inspected in a variety of ways. In some embodiments, the check score of a device to be inspected is positively correlated with an initial score, the cumulative runtime, the current continuous runtime, the count of repairs, etc., of the device to be inspected. The initial score is a predetermined value for determining the check score, which is predetermined based on experience.

In some embodiments, the gas company management platform calculates the check score based on the initial score, the cumulative runtime, the current continuous runtime, and the count of repairs using a first predetermined algorithm. In some embodiments, the first predetermined algorithm includes Equation (1):

$$J_C = F \times L \times X \times C \tag{1}$$

wherein $J_C$ denotes the check score, F indicates denotes initial score, L denotes the cumulative runtime, X denotes the current continuous runtime, and C denotes the count of repairs. The check scores corresponding to different refueling devices may be the same or different. In some embodiments, the unit of the cumulative runtime is year. The unit of the current continuous runtime is hour.

In 260, controlling a monitoring device to determine an additional monitoring parameter corresponding to each of the one or more devices to be inspected based on the device inspection instruction and uploading the additional monitoring parameter to the smart gas device object platform.

The monitoring device refers to a device that monitors the refueling device. In some embodiments, the monitoring device monitors at least one of a pressure, a temperature, a flow rate of the gas in the refueling device during the refueling process. In some embodiments, the monitoring device monitors an operating parameter of the refueling device. For example, the operating parameter of the refueling device includes at least one of a power, a temperature, or the like of the refueling device.

The additional monitoring parameter refers to a parameter related to controlling an additional monitoring device for additional monitoring of the one or more devices to be inspected. In some embodiments, the additional monitoring parameter includes at least one of an additional monitoring batch, an additionally turned-on monitoring device, or the like.

The additional monitoring batch is a parameter related to a frequency at which the additional monitoring is performed by the additional monitoring device on the one or more devices to be inspected. For example, the additional monitoring batch includes monitoring the one or more devices to be inspected every half hour, every hour, etc.

The additionally turned-on monitoring device is a monitoring device that is additionally turned on to monitor the one or more devices to be inspected when needed. The additionally turned-on monitoring device is different from a routine monitoring device. The routine monitoring device is a monitoring device that remains in a working state at all times to facilitate real-time monitoring of the one or more devices to be inspected.

In some embodiments, the additional monitoring parameter includes at least one of a type and a count of the additionally turned-on monitoring device. For example, the additional monitoring parameter includes additionally turning on a monitoring device that monitors a compressor, and the monitoring device additionally monitors the compressor at a frequency of every half hour.

In some embodiments, the monitoring device includes a plurality of sensors. For example, the monitoring device includes at least one of a pressure sensor, a temperature sensor, a flow sensor, or the like.

In some embodiments, the gas company management platform determines the additional monitoring parameter in a variety of ways. For example, the gas company management platform determines, based on the historical data, historical device inspection instructions and historical additional monitoring parameters corresponding to the historical device inspection instructions, and establishes a second data table based on the historical device inspection instructions and the historical additional monitoring parameters. Based on the device inspection instruction, the gas company management platform queries the second data table to determine a historical device inspection instruction that is the same as or similar to the device inspection instruction, and determines the historical additional monitoring parameter corresponding to the historical device inspection instruction as a target additional monitoring parameter.

In 270, obtaining aggregated additional monitoring parameters through the smart gas device object platform.

In some embodiments, the smart gas device object platform aggregates a plurality of additional monitoring parameters and uploads the plurality of additional monitoring parameters to the gas company management platform.

In 281, generating a first monitoring instruction and sending, through the smart gas device object platform, the first monitoring instruction to a first monitoring device associated with the one or more devices to be inspected.

The first monitoring instruction is a control instruction generated by the gas company management platform for controlling the first monitoring device. In some embodiments, the first monitoring instruction is configured to adjust an existing monitoring parameter of the first monitoring device.

In some embodiments, the existing monitoring parameter is similar to the additional monitoring parameter. More descriptions of the existing monitoring parameter may be found in the related description of the additional monitoring parameter.

In some embodiments, the first monitoring instruction is configured to regulate an existing monitoring batch corresponding to the existing monitoring parameter to be the same as the additional monitoring batch.

In some embodiments, the gas company management platform generates the first monitoring instruction in a variety of ways.

The first monitoring device refers to a routine monitoring device associated with each of the one or more devices to be inspected. More details regarding the routine monitoring device may be found in the preceding description.

In 282, generating a second monitoring instruction and sending, through the smart gas device object platform, the second monitoring instruction to a second monitoring device associated with the one or more devices to be inspected.

The second monitoring instruction is an instruction generated by the gas company management platform for controlling the second monitoring device. In some embodiments, the second monitoring instruction is configured to initiate new monitoring.

Initiating new monitoring refers to turning on at least one of a corresponding count of monitoring devices and a corresponding type of monitoring devices based on the additional monitoring instruction, so that the monitoring device conducts monitoring according to the additional monitoring batch.

In some embodiments, the gas company management platform generates the second monitoring instruction in a variety of ways.

The second monitoring device refers to an additionally turned-on monitoring device associated with each of the one or more devices to be inspected. More descriptions of the additionally turned-on monitoring device may be found in operation 281 and the related descriptions thereof.

In 290, generating an initial inspection result based on an additional monitoring result and a routine monitoring result, uploading the initial inspection result to the smart gas government safety supervision management platform, and storing the initial inspection result in a database.

The additional monitoring result is additional monitoring data obtained by the additionally turned-on monitoring device. For example, the additional monitoring result includes at least one of additional air pressure data, additional temperature data, and additional gas flow data detected by the additionally turned-on monitoring device corresponding to the refueling device (e.g., a compressor, an intake buffer device, a gas pretreatment device, a cooling system, a gas storage device, a refueling pipeline, etc.).

The routine monitoring result is routine monitoring data obtained by a routine monitoring device. For example, the routine monitoring result includes at least one of routine air pressure data, routine temperature data, and routine gas flow data detected by the routine monitoring device corresponding to the refueling device (e.g., the compressor, the intake buffer device, the gas pretreatment device, the cooling system, the gas storage device, and the refueling pipeline, etc.).

The initial inspection result is a result determined by the gas company management platform indicating whether there is an anomaly in at least one of the additional monitoring result and the routine monitoring result.

In some embodiments, the gas company management platform determines the initial inspection result in a variety of ways. For example, the gas company management platform determines a difference between a predetermined normal value and at least one of the additional monitoring result and the routine monitoring result and, and compares the difference to a monitoring difference threshold.

If the difference is greater than the monitoring difference threshold, it is determined that there is an anomaly in at least one of the additional monitoring result and the routine monitoring result, and the refueling device corresponding to at least one of the additional monitoring result and the routine monitoring result is determined as an abnormal refueling device.

The predetermined normal value and the monitoring difference threshold are preset values. In some embodiments, the gas company management platform determines the predetermined normal value and the monitoring difference threshold in a variety of ways. For example, the gas company management platform determines the predetermined normal value and the monitoring difference threshold from historical data, obtaining manual input, or the like.

In some embodiments, the database is disposed in a storage device of the smart control center.

More descriptions of the smart control center may be found in FIG. 1 and the related descriptions thereof.

The method for abnormality troubleshooting at a refueling station based on safety supervision provided in some embodiments of the present disclosure can process the refueling information and the refueled vehicle anomaly information, generate the refueling anomaly warning, and selectively troubleshooting the refueling device based on the refueling anomaly warning. The method can enhance monitoring of the refueling device that may have an abnormality. Based on the monitoring result, whether there is an anomaly in the refueling device can be determined. The method narrows down the scope of troubleshooting, thereby improving the efficiency and precision of the troubleshooting, and reducing device occupancy caused by troubleshooting normal refueling devices.

FIG. 3 is a schematic diagram illustrating a process for generating refueling error anomaly information according to some embodiments of the present disclosure. As shown in FIG. 3, process 300 includes one or more of the following operations. In some embodiments, process 300 is performed by a gas company management platform.

In some embodiments, the gas company management platform conducts a metering fluctuation determination at a predetermined judgment frequency.

The predetermined judgment frequency refers to a pre-set frequency at which a metering fluctuation is investigated and judged within a certain time frame. For example, in a time frame of 7:00 to 12:00, the metering fluctuation is investigated and judged 3 times. In a time frame of 12:00 to 18:00, the metering fluctuation is investigated and judged 5 times, or the like.

The metering fluctuation refers to that at least one piece of information included in the refueling information exceeds a preset maximum fluctuation value. For example, at least one of a refueling start time, a refueling end time, a refueling flow, or the like exceeds the preset maximum fluctuation value.

In some embodiments, the gas company management platform obtains the predetermined judgment frequency and the maximum fluctuation value in a variety of ways. For example, the gas company management platform obtains the predetermined judgment frequency and the maximum fluctuation value by obtaining manual input, obtaining from historical data, or the like.

The metering fluctuation determination refers to that the gas company management platform determines whether there is a metering fluctuation in the refueling information. In some embodiments, the metering fluctuation determination includes one or more of the following operations.

In 310, determining an analysis interval of a current metering fluctuation determination based on a current moment, and designating the analysis interval as a current analysis interval.

The analysis interval refers to at least one time period obtained after dividing a time range based on the predetermined judgment frequency. For example, if the time range is from 6:00 to 12:00 and the predetermined judgment frequency is six times, then each one-hour period within the time range (e.g., 6:00-7:00, 7:00-8:00, etc.) is an analysis interval.

The current analysis interval is the analysis interval in which a time point for performing the current metering fluctuation determination is located. For example, if the time point for the current metering fluctuation determination is 8:15, then the current analysis interval is from 8:00 to 9:00.

In some embodiments, the duration of each analysis interval is the same or different. In some embodiments, time intervals between any two adjacent metering fluctuation determinations is the same or different.

In 320, executing a first judgment instruction within the current analysis interval.

The first judgment instruction is a control instruction that controls the smart gas device object platform to obtain the refueling information. In some embodiments, the first judgment instruction includes selecting a first predetermined count of refueling intensive periods from the current analysis interval and obtaining the refueling information in the refueling intensive periods.

The refueling intensive period is a time interval in which a count of refueling events is greater than or equal to a predetermined count after a period of time is divided into a plurality of time intervals based on a second predetermined rule. For example, a current analysis interval from 8:00 to 9:00 is divided into six time intervals (i.e., 8:00-8:10, 8:10-8:20, 8:20 to 8:30, 8:30 to 8:40, 8:40 to 8:50, and 8:50-9:00) according to the second predetermined rule of a 10-minute interval. The count of refueling events corresponding to the six time intervals are 30, 10, 45, 20, 40, and 15, respectively. If the predetermined count is 30, the refueling intensive period is the time intervals of 8:00 to 8:10, 8:20 to 8:30, and 8:40 to 8:50.

The predetermined count is a preset value used to screen refueling intensive periods.

In some embodiments, the smart gas device object platform records the count of refueling events during each time period and uploads the count of refueling events to the gas company management platform.

The first predetermined count is a predetermined count for selecting refueling intensive periods. In some embodiments, the smart gas device object platform randomly selects the first predetermined count of refueling intensive periods from a plurality of refueling intensive periods based on the first predetermined count.

In some embodiments, the gas company management platform obtains the predetermined count, the second predetermined rule, and the first predetermined count in a variety of ways. For example, the gas company management platform obtains the predetermined count, the second predetermined rule, and the first predetermined count by obtaining manual input, obtaining from historical data, or the like.

In 330, performing a metering fluctuation analysis on refueling information in the refueling intensive periods to determine whether the refueling intensive periods include target refueling information.

The metering fluctuation analysis refers to the metering fluctuation determination performed by the gas company management platform on the refueling information to determine whether the refueling information includes a metering fluctuation.

More descriptions of the metering fluctuation may be found in FIG. 3 and the related descriptions thereof.

The target refueling information is refueling information which includes the metering fluctuation.

In 341, in response to determining that the refueling intensive periods include the target refueling information, generating a metering fluctuation set based on the target refueling information.

The metering fluctuation set is a dataset formed by at least one piece of metering fluctuation data. In some embodiments, a data format of the metering fluctuation set is the same as a data format of the refueling information.

The metering fluctuation data refers to data related to the metering fluctuation of the refueling information.

In some embodiments, the gas company management platform generates the metering fluctuation set based on the at least one piece of metering fluctuation data.

More details regarding the refueling information and the metering fluctuation may be found in the preceding description.

In 351, generating the refueling error anomaly information based on the metering fluctuation set, and storing the refueling error anomaly information in a storage device of a smart control center.

More descriptions of the refueling error anomaly information may be found in in FIG. 2 and the related descriptions thereof. More descriptions of the smart control center may be found in FIG. 1 and the related descriptions thereof.

In some embodiments, the gas company management platform generates a waveform chart based on the metering fluctuation set. Horizontal coordinates of the waveform chart represent refueling times and vertical coordinates of the waveform chart represent refueling volumes.

In some embodiments, the gas company management platform determines an average metering value of the refueling volumes within a time period between each positive fluctuation peak and negative fluctuation trough in the waveform chart.

In some embodiments, the gas company management platform determines a deviation of the average metering value from an average value of refueling volumes during a uniform refueling time period. If the deviation is greater than a predetermined deviation threshold, at least one piece of refueling information during the time period between the positive fluctuation peak and negative fluctuation trough in the waveform chart is determined to be the refueling error anomaly information.

In some embodiments, the absolute value of at least one of the peak and the trough in the waveform chart is greater than a maximum fluctuation value. More descriptions of the maximum fluctuation value may be found in FIG. 2 and the related descriptions thereof.

In some embodiments, the gas company management platform obtains the average value of the refueling volumes and the predetermined deviation threshold in a variety of ways. For example, the gas company management platform obtains the average value of the refueling volumes and the predetermined deviation threshold from manual input, historical data, or the like.

In some embodiments, the uniform refueling time period includes a time period that does not include a metering fluctuation. The average value of the refueling volumes during the uniform refueling time period includes a ratio of a total refueling volume to a total refueling time during the uniform refueling time period.

In some embodiments, the predetermined deviation threshold may be the maximum fluctuation value. More details regarding the maximum fluctuation value may be found in FIG. 2 and the related descriptions thereof.

In some embodiments, process 300 further includes the following operations.

In 342, in response to determining that the first predetermined count of refueling intensive periods do not include the target refueling information, executing one or more second judgment instructions.

A second judgment instruction is a control instruction that controls the smart gas device object platform to obtain an expansion interval pending evaluation. In some embodiments, the second judgment instruction includes selecting a target interval as the expansion interval pending evaluation from the current analysis interval.

The target interval is a time interval among a plurality of time intervals in the current analysis interval that is not selected by the first judgment instruction and not selected by one or more second judgment instructions that have been executed.

The expansion interval pending evaluation is a target interval selected from a plurality of target intervals to be analyzed at a future time.

In some embodiments, the smart gas device object platform selects the expansion interval pending evaluation in a variety of ways. For example, the smart gas device object platform selects the expansion interval pending evaluation randomly, or the like.

In 352, performing the metering fluctuation analysis on refueling information in the expansion interval pending evaluation to determine target refueling information in the expansion interval pending evaluation.

More details regarding the metering fluctuation analysis and the target refueling information may be found in operation 330 and the related descriptions thereof.

In 362, generating the refueling error anomaly information for the target refueling information in the current analysis interval based on the target refueling information obtained by at least one of the first judgment instruction and the one or more second judgment instructions and the metering fluctuation set corresponding to the target refueling information.

In some embodiments, a count of the one or more second judgment instructions does not exceed a second predetermined count.

The second predetermined count is a predetermined count for selecting expansion intervals pending evaluation. In some embodiments, the smart gas device object platform randomly selects a corresponding count of expansion intervals pending evaluation from a plurality of target intervals based on the second predetermined count.

In some embodiments, the gas company management platform obtains the second predetermined count in a variety of ways. For example, the gas company management platform obtains the second predetermined count from manual input, historical data, or the like.

In some embodiments, the second predetermined count is determined based on a time feature and the predetermined judgment frequency.

The time feature is a feature related to the count of the refueling intensive periods. In some embodiments, the time feature includes the count of the refueling intensive periods. In some embodiments, the second predetermined count is positively correlated to the time feature and negatively correlated to the predetermined judgment frequency.

In some embodiments, the gas company management platform determines the second predetermined count through a second predetermined algorithm. The second predetermined algorithm includes Equation (2):

$$N = \frac{M}{P} + k \tag{2}$$

wherein N denotes the second predetermined count, M denotes the time feature, P denotes the predetermined judgment frequency, and k denotes an adjustment coefficient.

In some embodiments, the gas company management platform determines the adjustment coefficient in a variety of ways. For example, the gas company management platform determines the adjustment coefficient by obtaining manual input, obtaining from historical data, or the like.

In some embodiments, the gas company management platform determines the adjustment coefficient by querying a third data table based on a gas source type and a frequency range of occurrences of abnormal refueling devices.

The gas source type refers to a type of gas that is added to a vehicle at a refueling station. For example, the gas source type includes at least one of Liquefied Natural Gas (LNG), Compressed Natural Gas (CNG), or the like.

In some embodiments, the third data table includes the gas source type, the frequency range of occurrences of abnormal refueling devices, and a corresponding adjustment coefficient. In some embodiments, the gas company management platform constructs the third data table based on historical gas source types, historical frequency ranges of occurrences of abnormal refueling devices, and historical adjustment coefficients obtained from historical data.

In some embodiments, the historical data includes historical data corresponding to different gas source types in a same period (e.g., between 6:00 and 12:00).

In some embodiments, the gas company management platform chronologically sorts predetermined time periods or refueling intensive periods corresponding to the same period, and inspects refueling devices from a first predetermined time period or a first refueling intensive period to determine a ranking of a predetermined time period or a refueling intensive period in which a first abnormal refueling device appears. The gas company management platform designates the ranking as the adjustment coefficient.

For example, after the gas company management platform sorts a plurality of predetermined time periods, if the first abnormal refueling device is detected at a 5th predetermined time period, the adjustment coefficient is determined to be 5.

More descriptions of the predetermined time period may be found in FIG. 2 and the related descriptions thereof. More descriptions of the refueling intensive period may be found in FIG. 3 and the related descriptions thereof.

In some embodiments, after all target intervals within the current analysis interval have been selected as expansion intervals pending evaluation and the one or more second judgment instructions are executed, the second judgment instruction is no longer executed.

More details regarding the predetermined judgment frequency, the generation of the metering fluctuation set, and the generation of the refueling error anomaly information may be found in the preceding description.

If the first predetermined count of refueling intensive periods do not include the target refueling information, one or more expansion intervals pending evaluation are investigated to determine whether the one or more expansion intervals pending evaluation includes the target refueling information, which is conducive to improving the accuracy of the determination of the target refueling information, and thus improving an accuracy of the determination of the refueling error anomaly information subsequently.

In some embodiments, the first predetermined count is determined based on a concentration degree of different refueling intensive periods in the analysis interval.

The concentration degree refers to data related to a count of pieces of the refueling information distributed in the refueling intensive periods. The smaller the count of the refueling intensive periods containing a same count of pieces of refueling information is, the higher the concentration degree is.

In some embodiments, the gas company management platform determines a count of refueling intensive periods in which a predetermined proportion of refueling information is distributed, and designates the count as the first predetermined count. For example, there are six refueling intensive periods in a current analysis interval from 8:00 to 10:00, the current analysis interval includes 100 pieces of refueling information, and the predetermined proportion is 90%. If 90 pieces of the refueling information are distributed among 5 refueling intensive periods, the first predetermined count is 5. If 90 pieces of the refueling information are distributed among 6 refueling intensive periods, the first predetermined count is 6. If 90 pieces of the refueling information are distributed among 1 refueling intensive period, the first predetermined count is 1.

In some embodiments, the gas company management platform determines the predetermined proportion in a variety of ways. For example, the gas company management platform determines the predetermined proportion by obtaining from historical data, obtaining manual input, or the like.

In some embodiments of the present disclosure, the first predetermined count of refueling intensive periods are selected from the current analysis interval, the target refueling information is determined based on the refueling information in the refueling intensive periods, and the refueling error anomaly information is generated based on the target refueling information. This approach divides the predetermined time periods and selectively obtains the refueling information within different time intervals (e.g., prioritizing the refueling information corresponding to the refueling intensive periods), reduces the amount of data processing of the gas company management platform, improves the efficiency of data processing, and focuses on key time periods (e.g., the refueling intensive periods) for target analysis to accurately determine the refueling anomaly information.

By making the first predetermined count correlate to the concentration degree, it is possible to preferentially select the refueling intensive period in which the refueling information is more concentrated when selecting the first predetermined count of refueling intensive periods. Therefore, the refueling error anomaly information is generated based on more data subsequently, which is conducive to further improving the accuracy of the refueling error anomaly information.

In some embodiments, the gas company management platform generates the refueling error anomaly information based on the refueled vehicle anomaly information and the metering fluctuation data corresponding to the refueling information.

More descriptions regarding the refueled vehicle anomaly information and the metering fluctuation data may be found in the preceding description.

In some embodiments, when refueled vehicle anomaly information is detected, the gas company management platform determines the metering fluctuation data corresponding to the refueled vehicle anomaly information as the refueling error anomaly information. That is to say, the metering fluctuation data of the refueling device corresponding to the refueled vehicle during a refueling time is determined as the refueling error anomaly information.

More descriptions of the refueling error anomaly information may be found in FIG. 2 and the related descriptions thereof.

In some embodiments, the maximum fluctuation value associated with the metering fluctuation is set by the refueling station. A predetermined error range associated with the refueling error anomaly information is set by a gas company. In some embodiments, the maximum fluctuation value is less than or equal to a maximum boundary value of the predetermined error range.

More descriptions of the maximum fluctuation value and the predetermined error range may be found in operation 220 and the related descriptions thereof.

In some embodiments, the gas company management platform determines the abnormal refueling device based on the refueling error anomaly information. For example, the gas company management platform obtains a device operating parameter and routine monitoring data during a time period corresponding to the refueling error anomaly information, determines a difference between the device operating parameter and a predetermined normal value and a difference between the routine monitoring data and the predetermined normal value respectively, and compares the differences with a monitoring difference threshold. If the difference between the device operating parameter and a predetermined normal value is greater than the monitoring difference threshold, it is determined that there is an anomaly in the additional monitoring result. If the difference between the routine monitoring data and the predetermined normal value is greater than the monitoring difference threshold, it is determined that there is an anomaly in the routine monitoring result.

More descriptions of the routine monitoring data, the predetermined normal value, and the monitoring difference threshold may be found in FIG. 2 and the related descriptions thereof.

In some embodiments, the gas company management platform sends a refueling anomaly warning to a refueling user terminal of an abnormal vehicle corresponding to the refueling anomaly warning.

The refueling user terminal refers to a terminal device used by a refueling user and communicatively connected to the refueling station. For example, the refueling user terminal includes at least one of a cell phone, a computer, or the like.

By taking into account the refueled vehicle anomaly information, the accuracy of the generated refueling error anomaly information can be improved, thereby preventing misjudgments due to anomalies of the refueled vehicle and avoiding unnecessary redundant troubleshooting.

FIG. 4 is a schematic diagram illustrating a process generating refueling error anomaly information via a refueling model according to some embodiments of the present disclosure.

As shown in FIG. 4, the gas company management platform 131 determines refueling error anomaly information 430 through a refueling model 420 based on refueled vehicle anomaly information 410-1, metering fluctuation set 410-2 including metering fluctuation data, and an environmental parameter 410-3.

The refueling model is a model for determining the refueling error anomaly information. In some embodiments, the refueling model is a machine learning model. For example, the refueling model includes a Deep Neural Networks (DNN) model, a Recurrent Neural Network (RNN) model, etc.

An input of the refueling model 420 includes the refueled vehicle anomaly information 410-1, the metering fluctuation set 410-2, and the environmental parameter 410-3 corresponding to each of at least one piece of refueling information, and an output of the refueling model 420 includes the refueling error anomaly information 430 corresponding to each of the at least one piece of refueling information.

The refueled vehicle anomaly information refers to information related to an anomalous condition of a refueled vehicle, which is obtained from a user terminal. In some embodiments, the refueled vehicle anomaly information includes at least one of an abnormal reading of a gas storage tank of the refueled vehicle, an abnormality of a refueling time, etc. The refueled vehicle anomaly information is uploaded by the gas user object platform 151. Further descriptions of the refueled vehicle anomaly information may be found in the corresponding description of FIG. 2.

In some embodiments, the metering fluctuation set includes a plurality of pieces of metering fluctuation data corresponding to the refueling information. The metering fluctuation data refers to fluctuating refueling information of a refueling device corresponding to the refueled vehicle during the refueling time.

In some embodiments, a system platform (e.g., the gas company management platform 131) determines refueling information corresponding to the refueled vehicle anomaly information based on the refueled vehicle anomaly information 410-1, and determines refueling information of a plurality of other vehicles in time periods that are the same as or similar to the refueling time of the refueled vehicle, thereby determining a plurality of pieces of metering fluctuation data to obtain the metering fluctuation set 410-2 including the plurality of pieces of metering fluctuation data.

The environmental parameter refers to a parameter monitored by an environmental monitoring device, which is related to an environment in which the refueling device is located. For example, the environmental parameter includes an environmental temperature of the environment in which the refueling device is located. The environmental parameter is obtained by the environmental monitoring device connected to the smart gas device object platform 152 via a signal. More descriptions of the smart gas device object platform 152 may be found in FIG. 1 and the related descriptions thereof. More descriptions of the environmental parameter may be found in FIG. 5 and the related description thereof.

The refueling error anomaly information refers to refueling error information which is abnormal. The refueling error is determined based on a ratio of a difference between an actual refueling flow volume and a preset flow volume in a predetermined time period to the preset flow volume.

In some embodiments, the refueling error anomaly information includes at least one of an anomalous time and an anomalous amount. The anomalous time of the refueling error includes a refueling start time, a refueling end time, a refueling duration, or the like, in which an error occurs.

In some embodiments, the refueling model is obtained by training a plurality of sets of training samples with labels. In some embodiments, the training samples are determined based on historical monitoring data or generated based on a platform simulation. In some embodiments, the training samples generated based on the platform simulation include: generating the training samples through platform simulation based on target historical data.

The target historical data refers to historical monitoring data used to simulate and generate the training samples. In some embodiments, the target historical data includes historical monitoring data which includes the refueling error anomaly information.

In some embodiments, the refueling model is obtained by training the plurality of sets of training samples with labels. For example, the plurality of sets of training samples with labels are input into an initial refueling model, a loss function is constructed based on the labels and a result of the initial refueling model, and a parameter of the initial refueling model is iteratively updated based on the loss function. In some embodiments, the iterative updating of the parameter of the initial refueling model is performed by a plurality of techniques. For example, the iterative updating is performed based on gradient descent. The model training is completed when a predetermined condition is satisfied, and a trained refueling model is obtained. The predetermined condition includes that the loss function converges, a count of iterations reaches a threshold, or the like.

In some embodiments, each set of the plurality of sets of training samples include sample refueled vehicle anomaly information, a sample metering fluctuation set, and a sample environmental parameter. The label includes refueling error anomaly information.

In some embodiments, the plurality of sets of training samples are determined based on the historical monitoring data or generated based on the platform simulation. For example, an refueling error in the historical monitoring data is used as a label, and based on the historical monitoring data, a plurality of sets of training samples containing the refueling error anomaly information and a plurality of sets of training samples without refueling error anomaly information are generated through the platform simulation (e.g., through simulation performed by the gas company management platform 131). The refueling error in the historical monitoring data refers to an actual refueling error determined by monitoring. The label (i.e., output of the model) corresponding to the training samples without refueling error anomaly information includes that the training samples have no refueling error anomaly information or an anomalous amount is zero.

In some embodiments, the training samples without the refueling error anomaly information is generated through platform simulation based on the refueling time of the refueled vehicle and a maximum fluctuation value of the metering fluctuation data. In some embodiments, an algorithm for generating the training samples through the platform simulation includes, but is not limited to, a pseudo-random number generator, an inverse transformation technique, or the like. More details regarding the refueling time of the refueled vehicle and the maximum fluctuation value of the metering fluctuation data may be found in the preceding description.

The refueling model described in some embodiments of the present disclosure can quickly and accurately determine the refueling error anomaly information, providing data support for identifying the abnormal refueling device in subsequent operations. By generating the training samples of the refueling model through the platform simulation, a training effect and a recognition accuracy of the refueling model can be improved. In addition, by determining the refueling error anomaly information based on the refueled vehicle anomaly information, the accuracy of the determined refueled vehicle anomaly information can be improved, thereby avoiding unnecessary redundant troubleshooting work caused by misjudgments.

FIG. 5 is a schematic diagram illustrating a process for generating a device self-inspection parameter according to some embodiments of the present disclosure.

In some embodiments, the gas company management platform 131 obtains an environmental parameter 511 through an environmental monitoring device that is connected to the smart gas device object platform via a signal.

The environmental monitoring device is a device for monitoring the environmental parameter 511. In some embodiments, the environmental monitoring device includes at least one of a temperature sensor, a humidity sensor, or the like. The environmental parameter 511 refers to a parameter monitored by the environmental monitoring device, which relates to an environment in which a refueling device is located. In some embodiments, the environmental parameter 511 includes at least one of an environmental temperature, an environmental humidity, or the like of the environment in which the refueling device is located.

In some embodiments, the environmental monitoring device obtains the environmental parameter 511 and uploads the environmental parameter 511 to the smart gas device object platform.

In some embodiments, the gas company management platform 131 generates a correction check result 520 based on the environmental parameter 511, an additional monitoring result 512, and a routine monitoring result 513, and sends the correction check result 520 to the government safety supervision management platform 110.

More descriptions of the additional monitoring result and the routine monitoring result may be found in FIG. 2 and the related descriptions thereof.

The correction check result 520 refers to a check result obtained after correcting an initial inspection result by taking into account the influence of environmental factors.

In some embodiments, the initial inspection result determined by the gas company management platform is that there is an anomaly in at least one of the additional monitoring result 512 and in the routine monitoring result 513, and the refueling device corresponding to at least one of the additional monitoring result 512 and the routine monitoring result 513 is determined as an abnormal refueling device. The gas company management platform 131 determines an impact magnitude of the environmental parameter 511 on the refueling device based on the environmental parameter 511, and adjusts a monitoring difference threshold based on the impact magnitude. The gas company management platform 131 re-compares a difference with an adjusted monitoring difference threshold, and determines whether there is an anomaly in at least one of the additional monitoring result 512 and the routine monitoring result 513. The difference refers to at least one of a difference between the additional monitoring result and the predetermined normal value and a difference between the routine monitoring result and the predetermined normal value.

The impact magnitude refers to a degree to which the environmental parameter 511 affects the refueling device. For example, an environmental temperature of 35° C. affects the efficiency of a compressor.

In some embodiments, the gas company management platform 131 determines the impact magnitude in a variety of ways. For example, the gas company management platform 131 constructs a fourth data table based on a historical environmental parameter 511 and a historical impact magnitude in historical data. The fourth data table includes historical environmental parameters 511 and historical impact magnitudes of the historical environmental parameters 511 on refueling devices. The gas company management platform queries the fourth data table based on the environmental parameter 511 and the abnormal refueling device, determines a historical environmental parameter corresponding to the environmental parameter 511, and determines the historical impact magnitude of the historical environmental parameter 511 on refueling devices as the impact magnitude of the environmental parameter 511 on the abnormal refueling device.

In some embodiments, the gas company management platform determines the historical impact magnitude based on a plurality of pieces of historical monitoring data in the historical data. In some embodiments, the gas company management platform determines a count of inspections performed on one or more devices to be inspected during a historical time period. The gas company management platform determines also determines a count of non-anomalous instances in which a monitoring result after inspection is abnormal due to the environmental parameter 511, but the one or more devices to be inspected are not anomalous. The gas company management platform determines a ratio of the count of non-anomalous instances to the count of inspections, and determines the ratio as the impact magnitude.

For example, in the historical monitoring data, the count of inspections performed on the one or more devices (e.g., a compressor, etc.) to be inspected is 10, of which 9 inspections show abnormalities in at least one of the additional monitoring result 512 and the routine monitoring result 513 due to a high environmental temperature in the environmental parameter 511, but the compressor is actually normal. Therefore, the count of non-anomalous instances is 9, and the impact magnitude is 0.9.

In some embodiments, the gas company management platform 131 adjusts the monitoring difference threshold in a variety of ways. In some embodiments, the adjusted monitoring difference threshold is positively correlated to the impact magnitude. In some embodiments, the gas company management platform 131 calculates the adjusted monitoring difference threshold based on a third predetermined algorithm. The third predetermined algorithm includes Equation (3):

$$C_t = C_y \times (1 + Y_f) \tag{3}$$

wherein $C_t$ denotes the adjusted monitoring difference threshold, $C_y$ denotes the monitoring difference threshold, and $Y_f$ denotes the impact magnitude.

More details regarding the additional monitoring result, the routine monitoring result, the predetermined normal value, the initial inspection result, and the monitoring difference threshold may be found in the related description of FIG. 2.

In some embodiments, the gas company management platform 131 determines a permissible value of an operating parameter of each of the one or more devices to be inspected based on the environmental parameter and a check score corresponding to a device inspection instruction.

More descriptions of the device inspection instruction and the check score may be found in FIG. 2 and the related descriptions thereof.

The operating parameter of a device to be inspected refers to a parameter related to the operation of the device to be inspected, for example, an operating power of the device to be inspected.

In some embodiments, the gas company management platform 131 obtains the operating parameter in a variety of ways. For example, at least one of obtaining manual input, obtaining from historical data, obtaining from a vendor, or the like.

The permissible value of a device to be inspected refers to a parameter used to characterize a permissible degree for a working intensity of the device to be inspected under different environmental parameters 511. The lower the permissible value is, the wider or greater the permissible degree is. In some embodiments, the permissible values corresponding to different devices to be inspected are the same or different.

The permissible degree of a device to be inspected refers to an extent to which a load of the device to be inspected may be reduced when operating in an abnormal environment (e.g., a high-temperature environment with a temperature exceeding 35° C.). By reducing the load on the device to be inspected, malfunctions can be avoided when the device to be inspected operates under abnormal conditions.

In some embodiments, the gas company management platform obtains the permissible value in a variety of ways. In some embodiments, the permissible value is positively correlated to the check score and negatively correlated to the impact magnitude. In some embodiments, the gas company management platform 131 calculates the permissible value through a fourth predetermined algorithm. The fourth predetermined algorithm includes Equation (4):

$$R_x = J_C \times e^{-Y_f} \qquad (4)$$

wherein $R_x$ denotes the permissible value, $J_C$ denotes the check score, and $Y_f$ denotes the impact magnitude. More details regarding the check score and the impact magnitude may be found in the preceding description.

In some embodiments, the gas company management platform 131 generates the correction check result by correcting the initial inspection result based on the permissible value, the additional monitoring result and the routine monitoring result.

In some embodiments, the gas company management platform 131 compares the permissible value to a permissible threshold. If the permissible value is less than the permissible threshold, the device to be inspected corresponding to the permissible value is determined as a normal device.

The permissible threshold is a preset value for comparing with the permissible value. In some embodiments, the gas company management platform 131 obtains the permissible threshold in a variety of ways. For example, the gas company management platform 131 obtains the permissible threshold from historical data, from manual input, or the like.

In some embodiments, the gas company management platform sorts the one or more devices to be inspected based on their check scores, and the gas company management platform 131 determines a lowest check score corresponding to a refueling device that is not an abnormal refueling device in the initial inspection result as the permissible threshold. The lowest check score corresponding to the refueling device that is not a refueling abnormal device may be a statistical result. For example, if the refueling device corresponding to the lowest check score is not an abnormal refueling device by counting a predetermined count of times (e.g., 3 times, 5 times, etc.), the lowest check score is determined as the permissible threshold.

More details regarding the additional monitoring result, the routine monitoring result, the initial inspection result, the correction check result, and the check score may be found in the preceding description.

When generating the correction check result 520, the impact of environmental anomalies on the refueling device is considered by considering the permissible value, which is conducive to excluding interfering data generated by environmental anomalies and improving the accuracy of the correction check result.

In some embodiments, the gas company management platform obtains a refueling quality ranking 530 generated by a government safety supervision management platform 110. The refueling quality ranking 530 is generated based on correction check results 520 of refueling stations corresponding to a same gas source type.

More descriptions of the government safety supervision management platform 110 may be found in FIG. 1 and the related descriptions thereof.

The refueling quality ranking 530 is a ranking order of refueling quality of the refueling stations. In some embodiments, a rank of a refueling station in the refueling quality ranking 530 is negatively correlated to a count of occurrences of abnormalities of the refueling devices in the refueling station.

In some embodiments, the government safety supervision management platform determines the refueling quality ranking 530 in a variety of ways. For example, the government safety supervision management platform determines a count of occurrences of abnormalities of the refueling devices of each of a plurality of refueling stations corresponding to a same gas source (e.g., CNG, LNG, etc.) based on correction check results 520 of the refueling stations within a historical time period, and sorts the plurality of refueling stations based on the count of occurrences of abnormalities of the refueling devices in each of the refueling stations.

In some embodiments, the larger the count of occurrences of abnormalities of the refueling devices in a refueling station is, the lower the rank of the refueling station is in the refueling quality ranking 530. In some embodiments, if the counts of occurrences of abnormalities of the refueling devices in different refueling stations are the same, the further a latest abnormality in the refueling devices in a refueling station is from a current time, the lower the rank of the refueling station is in the refueling quality ranking 530.

In some embodiments, the gas company management platform generates the device self-inspection parameter corresponding to a refueling station based on the refueling quality ranking 530 and sends the device self-inspection parameter 540 to the refueling station.

The device self-inspection parameter 540 corresponding to a refueling station is a control instruction that is sent to the refueling station to control the refueling station to inspect the refueling device corresponding to the refueling station. In some embodiments, the device self-inspection parameter 540 includes a self-inspection cycle 541 and a self-inspection device 542.

In some embodiments, the gas company management platform determines the device self-inspection parameter 540 in a variety of ways. For example, the gas company management platform determines the device self-inspection parameter by obtaining manual input, obtaining from historical data, or the like based on experience.

The self-inspection cycle 541 is a cycle during which the refueling station inspects the refueling device corresponding to the refueling station. For example, the self-inspection cycle includes inspecting once everyday, once every two days, or the like.

In some embodiments, the duration of the self-inspection cycle 541 is correlated to the rank of the refueling station in the refueling quality ranking 530. For example, the lower the rank of the refueling station in the refueling quality ranking 530 is, the shorter the self-inspection cycle 541 is.

The self-inspection device 542 refers to a refueling device that needs to be inspected by the refueling station. For example, the self-inspection device 542 includes at least one of a compressor, an intake buffer device, a gas pretreatment device, a cooling system, a gas storage device, a refueling pipeline, or the like.

In some embodiments, the self-inspection device includes an abnormal refueling device.

More descriptions of the abnormal refueling device may be found in FIG. 2 and the related descriptions thereof.

In some embodiments, the refueling quality ranking 530 is generated based on the correction check results of refueling stations corresponding to a same gas source.

In some embodiments, the gas company management platform may classify and statistically analyze correction check results 520 of different refueling stations according to gas source type, determine refueling quality rankings 530 corresponding to different gas source types, and ensure that the refueling stations in a same refueling quality ranking 530 correspond to a same gas source type.

In some embodiments, the device self-inspection parameter 540 may correspond to different refueling stations corresponding to different gas source types.

In some embodiments, at least one refueling station corresponds to a plurality of gas source types. In response to determining a sum of counts of occurrences of abnormalities of the refueling devices in the at least one refueling station reaches a highest value or exceeds an average of historical counts of occurrences of abnormalities of refueling devices, or a rank of each of the at least one refueling station exceeds a ranking threshold, the gas company management platform determines a ratio of the sum of the counts of occurrences of abnormalities of the refueling devices in the at least one refueling station to the average of historical counts of occurrences of abnormalities of refueling devices, and adjusts the self-inspection cycle in the self-inspection parameter corresponding to the at least one refueling station.

The ranking threshold is a preset value. For example, the ranking threshold includes a third rank, a fourth rank, or the like. The gas company management platform determines the ranking threshold in a variety of ways. For example, the gas company management platform determines the ranking threshold by obtaining manual input, obtaining from historical data, or the like.

The average of the historical counts of occurrences of abnormalities of refueling devices refers to an average value of the counts of occurrences of abnormalities of refueling devices in a plurality of refueling stations corresponding to one or more gas source types over a historical time period. In some embodiments, the gas company management platform determines a ratio of a sum of the counts of occurrences of abnormalities of the refueling devices in the plurality of refueling stations corresponding to the one or more gas source types to a total count of the plurality of refueling stations in the historical time period, and determines the ratio as the average of the historical counts of occurrences of abnormalities of refueling devices.

In some embodiments, the gas company management platform determines an adjusted self-inspection cycle 541 in a variety of ways. In some embodiments, the gas company management platform may determine a ratio of a count of occurrences of abnormalities of the refueling devices in the at least one refueling station for which the self-inspection cycle 541 is adjusted to the average of the historical counts of occurrences of abnormalities of the refueling devices, and the adjusted self-inspection cycle 541 is negatively correlated to the ratio.

In some embodiments, the gas company management platform calculates the adjusted self-inspection cycle by a fifth predetermined algorithm. The fifth predetermined algorithm includes Equation (5):

$$Z_t = \frac{Z_J}{(Y_Z \div Y_j)} \qquad (5)$$

wherein $Z_t$ denotes the adjusted self-inspection cycle, $Z_J$ denotes the self-inspection cycle, $Y_Z$ denotes the sum of the counts of occurrences of abnormalities of the refueling devices, and $Y_j$ indicates the average of the historical counts of occurrences of abnormalities of the refueling devices.

The types of gas sources for different refueling stations and for different periods of time may be different, and different types of gas sources may affect monitoring data of the refueling devices. By categorizing refueling stations according to the gas source type, and by generating the refueling quality ranking 530 for refueling stations corresponding to a same gas source type, it is possible to eliminate statistical biases caused by differences in gas source types and allows for targeted determination of the device self-inspection parameter 540 of the refueling device based on the gas source types, thereby improving the accuracy of the determined device self-inspection parameter 540. By adjusting the self-inspection cycle 541, it is possible to specifically adjust the self-inspection cycle 541 of the refueling station with a large count of occurrences of abnormalities of refueling devices, which is conducive to reducing the count of occurrences of abnormalities of the refueling devices the refueling station.

Generating the correction check result 520 based on the environmental parameter 511 takes into account the impact of the environmental parameter 511 on the operating status of the refueling device, which helps to improve the accuracy of the generated correction check result 520. Generating the device self-inspection parameter 540 based on the refueling quality ranking 530 allows for the targeted generation of different device self-inspection parameters 540, and controlling different refueling stations to perform inspections based on their corresponding self-check parameters 540. This can reduce the occurrence of misjudgments. For refueling stations with higher ranks in the refueling quality ranking 530, it helps avoid frequent manual inspections that may affect the operational efficiency of the refueling stations.

The basic concepts have been described above, and it is apparent to those skilled in the art that the foregoing detailed disclosure is intended as an example only and does not constitute a limitation of the present disclosure. While not expressly stated herein, those skilled in the art may make various modifications, improvements, and amendments to the present disclosure. These modifications, improvements, and amendments are suggested in the present disclosure, so these modifications, improvements, and amendments remain within the spirit and scope of the exemplary embodiments of the present disclosure.

Meanwhile, the present disclosure uses specific words to describe embodiments of the present disclosure. Such as "one embodiment", "an embodiment", and/or "some embodiments" mean a feature, structure, or characteristic associated with at least one embodiment of the present disclosure. Accordingly, it should be emphasized and noted that "an embodiment", "one embodiment" or "an alternative embodiment" referred to two or more times in different locations in the present disclosure do not necessarily refer to the same embodiment. In addition, certain features, structures, or characteristics of one or more embodiments of the present disclosure may be suitably combined.

Additionally, unless expressly stated in the claims, the order of the processing elements and sequences, the use of numerical letters, or the use of other names as described in the present disclosure are not intended to limit the order of the processes and methods of the present disclosure. While some embodiments of the present disclosure that are currently considered useful are discussed in the foregoing disclosure by way of various examples, it should be understood that such details serve only illustrative purposes, and that additional claims are not limited to the disclosed embodiments; rather, the claims are intended to cover all amendments and equivalent combinations that are consistent with the substance and scope of the embodiments of the present disclosure. For example, although the implementation of various components described above may be embodied in a hardware device, it is also implemented as a software only solution, e.g., an installation on an existing server or mobile device.

Similarly, it should be noted that in order to simplify the presentation of the present disclosure, and thereby aid in the understanding of one or more embodiments of the present disclosure, the foregoing descriptions of embodiments of the present disclosure sometimes combine a variety of features into a single embodiment, a drawing, or descriptions thereof. However, this method of disclosure does not imply that more features are required for the objects of the present disclosure than are mentioned in the claims. Rather, claimed subject matter lies in less than all features of a single foregoing disclosed embodiment.

Some embodiments use numbers describing the number of components and attributes, and it should be understood that such numbers used in the description of embodiments are modified in some examples by modified words "approximately", "nearly", or "substantially". Unless otherwise noted, the terms "about", "approximate", and "approximately" indicate that a ±20% variation in the stated number is allowed. Correspondingly, in some embodiments, the numerical parameters used in the present disclosure and claims are approximations, which are subject to change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each patent, patent application, patent application disclosure, and other material cited in the present disclosure, such as articles, books, manuals, publications, documents, etc., the entire contents of which are incorporated herein by reference. Historical application documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for abnormality troubleshooting at refueling stations based on safety supervision, performed by a gas company management platform of an Internet of Things (IoT) system for abnormality troubleshooting at refueling stations based on safety supervision, the method comprising:
   collecting refueling information of at least one refueled vehicle during a predetermined time period through a smart gas device object platform;
   processing the refueling information to generate refueling error anomaly information;
   receiving, through a smart control center, refueled vehicle anomaly information uploaded by a gas user object platform;
   generating a refueling anomaly warning based on the refueling error anomaly information and the refueled vehicle anomaly information and sending the refueling anomaly warning to a console of a refueling system of a refueling station corresponding to the refueling anomaly warning and to a smart gas government safety supervision management platform, wherein the refueling information collected in the predetermined time period is related with at least one of an abnormal vehicle and a refueling time corresponding to the refueled vehicle anomaly information;
   generating a device inspection instruction based on the refueling anomaly warning and a device characteristic of a refueling device obtained from the refueling system;
   controlling a monitoring device to determine an additional monitoring parameter corresponding to each of one or more devices to be inspected based on the device inspection instruction and uploading the additional monitoring parameter to the smart gas device object platform;
   obtaining aggregated additional monitoring parameters corresponding to the one or more devices to be inspected through the smart gas device object platform, wherein the additional monitoring parameter corresponding to a device . . . to be inspected includes at least one of an additional monitoring batch and an additionally turned-on monitoring device corresponding to the device to be inspected;
   generating a first monitoring instruction and sending, through the smart gas device object platform, the first monitoring instruction to a first monitoring device associated with the one or more devices to be inspected, wherein the first monitoring instruction is configured to adjust an existing monitoring parameter of the first monitoring device, and the first monitoring device is a monitoring device that is currently performing monitoring;

generating a second monitoring instruction and sending, through the smart gas device object platform, the second monitoring instruction to a second monitoring device associated with the one or more devices to be inspected, wherein the second monitoring instruction is configured to initiate new monitoring, and the second monitoring device is a monitoring device that has not initiated monitoring; and generating an initial inspection result based on an additional monitoring result and a routine monitoring result, uploading the initial inspection result to the smart gas government safety supervision management platform, and storing the initial inspection result in a database.

2. The method of claim 1, wherein the processing the refueling information to generate refueling error anomaly information further includes:

conducting a metering fluctuation determination at a predetermined judgment frequency, the metering fluctuation determination including:

determining an analysis interval of a current metering fluctuation determination based on a current moment, and designating the analysis interval of the current metering fluctuation determination as a current analysis interval;

executing a first judgment instruction within the current analysis interval, wherein the first judgment instruction includes: selecting a first predetermined count of refueling intensive periods from the current analysis interval and obtaining refueling information in the refueling intensive periods;

performing a metering fluctuation analysis on the refueling information in the refueling intensive periods to determine whether the refueling intensive periods include target refueling information;

in response to determining that the refueling intensive periods include the target refueling information, generating a metering fluctuation set based on the target refueling information; and generating the refueling error anomaly information based on the metering fluctuation set, and storing the refueling error anomaly information in a storage device of the smart control center.

3. The method of claim 2, wherein the processing the refueling information to generate refueling error anomaly information further includes:

generating the refueling error anomaly information based on the refueled vehicle anomaly information and metering fluctuation data corresponding to the refueling information; and the generating a refueling anomaly warning based on the refueling error anomaly information and the refueled vehicle anomaly information and sending the refueling anomaly warning to a console of a refueling system of a refueling station corresponding to the refueling anomaly warning and to a smart gas government safety supervision management platform further includes:

sending the refueling anomaly warning to a refueling user terminal corresponding to the abnormal vehicle.

4. The method of claim 1, further comprising:

obtaining an environmental parameter through an environmental monitoring device that is connected to the smart gas device object platform via a signal;

generating a correction check result based on the environmental parameter, the additional monitoring result, and the routine monitoring result, and sending the correction check result to a government safety supervision management platform;

obtaining a refueling quality ranking generated by the government safety supervision management platform, the refueling quality ranking being generated based on correction check results of refueling stations corresponding to a same gas source type; and generating a device self-inspection parameter corresponding to each of the refueling stations based on the refueling quality ranking, and sending the device self-inspection parameter to the corresponding refueling station, the device self-inspection parameter including a self-inspection cycle and a self-inspection device.

5. The method of claim 4, wherein the refueling quality ranking is generated based on the correction check results of the refueling stations corresponding to the same gas source type and correction check results of refueling stations corresponding to different gas source types, and device self-inspection parameters correspond to the refueling stations corresponding to the different gas source types.

6. A non-transitory computer-readable storage medium storing computer instructions, wherein when a computer reads the computer instructions in the storage medium, the computer executes the method for abnormality troubleshooting at refueling stations based on safety supervision of claim 1.

7. An Internet of Things (IoT) system for abnormality troubleshooting at refueling stations based on safety supervision, comprising: a smart gas government safety supervision management platform, a smart gas government safety supervision sensor network platform, a smart gas government safety supervision object platform, a gas company sensor network platform, and a gas user object platform and a smart gas device object platform interacting with the gas company sensor network platform, wherein the smart gas government safety supervision object platform includes a gas company management platform; the smart gas government safety supervision sensor network platform interacts with the smart gas government safety supervision management platform and the gas company management platform, respectively;

the gas company management platform is disposed in a smart control center of a gas company, the smart control center including a server, a storage device, and a data transmission component, and the gas company management platform is connected to the smart gas device object platform at the refueling stations via a signal based on a communication network, the communication network being operated under the control of the gas company sensor network platform;

the gas company management platform is configured to:

collect refueling information of at least one refueled vehicle during a predetermined time period through a smart gas device object platform;

process the refueling information to generate refueling error anomaly information;

receive, through the smart control center, refueled vehicle anomaly information uploaded by the gas user object platform;

generate a refueling anomaly warning based on the refueling error anomaly information and the refueled vehicle anomaly information, and send the refueling anomaly warning to the console of the refueling system of a refueling station corresponding to the refueling anomaly warning and to the smart gas government safety supervision management platform, wherein the refueling information collected in the predetermined time period is related with at least one of an abnormal vehicle and a refueling time corresponding to the refueled vehicle anomaly information, generate a device inspection instruction based on the refueling anomaly warning and a device characteristic of a refueling device obtained from the refueling system;

control a monitoring device to determine an additional monitoring parameter corresponding to each of one or more devices to be inspected based on the device inspection instruction, and upload the additional monitoring parameter to the smart gas device object platform;

obtain aggregated additional monitoring parameters corresponding to the one or more devices to be inspected through the smart gas device object platform, wherein the additional monitoring parameter corresponding to a device to be inspected includes at least one of an additional monitoring batch and an additionally turned-on monitoring device corresponding to the device to be inspected;

generate a first monitoring instruction and send, through the smart gas device object platform, the first monitoring instruction to a first monitoring device associated with the one or more devices to be inspected, wherein the first monitoring instruction is configured to adjust an existing monitoring parameter of the first monitoring device, and the first monitoring device is a monitoring device that is currently performing monitoring;

generate a second monitoring instruction and send, through the smart gas device object platform, the second monitoring instruction to a second monitoring device associated with the one or more devices to be inspected wherein the second monitoring instruction is configured to initiate new monitoring, and the second monitoring device is a monitoring device that has not initiated monitoring; and generate an initial inspection result based on an additional monitoring result and a routine monitoring result, upload the initial inspection result to the smart gas government safety supervision management platform, and store the initial inspection result in a database; and the gas company sensor network platform includes sensor network sub-platforms corresponding to the refueling stations, the sensor network sub-platforms being configured on communication servers of the refueling stations; the smart gas device object platform is disposed in a control center of each of the refueling stations and connected to a refueling system corresponding to each of the refueling stations via a signal, the refueling system including a console and a plurality of refueling devices.

8. The IoT system of claim 7, wherein the gas company management platform is further configured to:

conduct a metering fluctuation determination at a predetermined judgment frequency, wherein to conduct the metering fluctuation determination, the gas company management platform is further configured to:

determine an analysis interval of a current metering fluctuation determination based on a current moment, and designate the analysis interval of the current metering fluctuation determination as a current analysis interval;

execute a first judgment instruction within the current analysis interval, wherein the first judgment instruction includes: selecting a first predetermined count of refueling intensive periods from the current analysis interval and obtaining refueling information in the refueling intensive periods;

perform a metering fluctuation analysis on the refueling information in the refueling intensive periods to determine whether the refueling intensive periods include target refueling information;

in response to determining that the refueling intensive periods include the target refueling information, generate a metering fluctuation set based on the target refueling information; and generate the refueling error anomaly information based on the metering fluctuation set, and store the refueling error anomaly information in a storage device of the smart control center.

9. The IoT system of claim 8, wherein the gas company management platform is further configured to:

generate the refueling error anomaly information based on the refueled vehicle anomaly information and metering fluctuation data corresponding to the refueling information; and to generate the refueling anomaly warning based on the refueling error anomaly information and the refueled vehicle anomaly information and send the refueling anomaly warning to the console of the refueling system of the refueling station corresponding to the refueling anomaly warning and to the smart gas government safety supervision management platform, the gas company management platform is further configured to:

send the refueling anomaly warning to a refueling user terminal corresponding to the abnormal vehicle.

* * * * *